United States Patent [19]

Pelloux-Gervais et al.

[11] 4,159,359

[45] Jun. 26, 1979

[54] INSULATING MATERIAL WITH LOW THERMAL CONDUCTIVITY, FORMED OF A COMPACTED GRANULAR STRUCTURE

[75] Inventors: Pierre Pelloux-Gervais, Grenoble; Daniel Goumy, Saint Egreve, both of France

[73] Assignee: L'Air Liquide Societe Anonyme pour l'Etude et l'Exploitation des Procedes Georges Claude, France

[21] Appl. No.: 822,327

[22] Filed: Aug. 5, 1977

[30] Foreign Application Priority Data

Aug. 5, 1976 [FR] France ................................ 76 23899

[51] Int. Cl.² ............................................. B32B 9/04
[52] U.S. Cl. ...................................... 428/76; 428/402; 428/447; 264/332; 62/529; 52/3; 13/35; 110/336; 432/65
[58] Field of Search ........................... 428/76, 402, 447

[56] References Cited

U.S. PATENT DOCUMENTS

| | | | |
|---|---|---|---|
| 3,151,365 | 10/1964 | Glaser et al. | 428/76 |
| 3,962,014 | 6/1976 | Hughes et al. | 428/76 |

*Primary Examiner*—P. C. Ives
*Attorney, Agent, or Firm*—Browdy & Neimark

[57] ABSTRACT

Insulating material, of compacted structure and of low thermal conductivity, is formed of silica-based primary particles; it is obtained by heat treatment of a compound of silane, of which the mean diameter is at most equal to 100 Å; the apparent density $\rho a$ expressed in g/cc is between $6.10^{-3}$ and $2.3.10^{-3} d$, d being the mean diameter of the primary particles expressed in Å; in addition, this apparent density is at most equal to two thirds of the density of the solid material.

This material is applicable as a thermal insulator in the field involving low temperatures and high temperatures and in the building sector.

16 Claims, 1 Drawing Figure

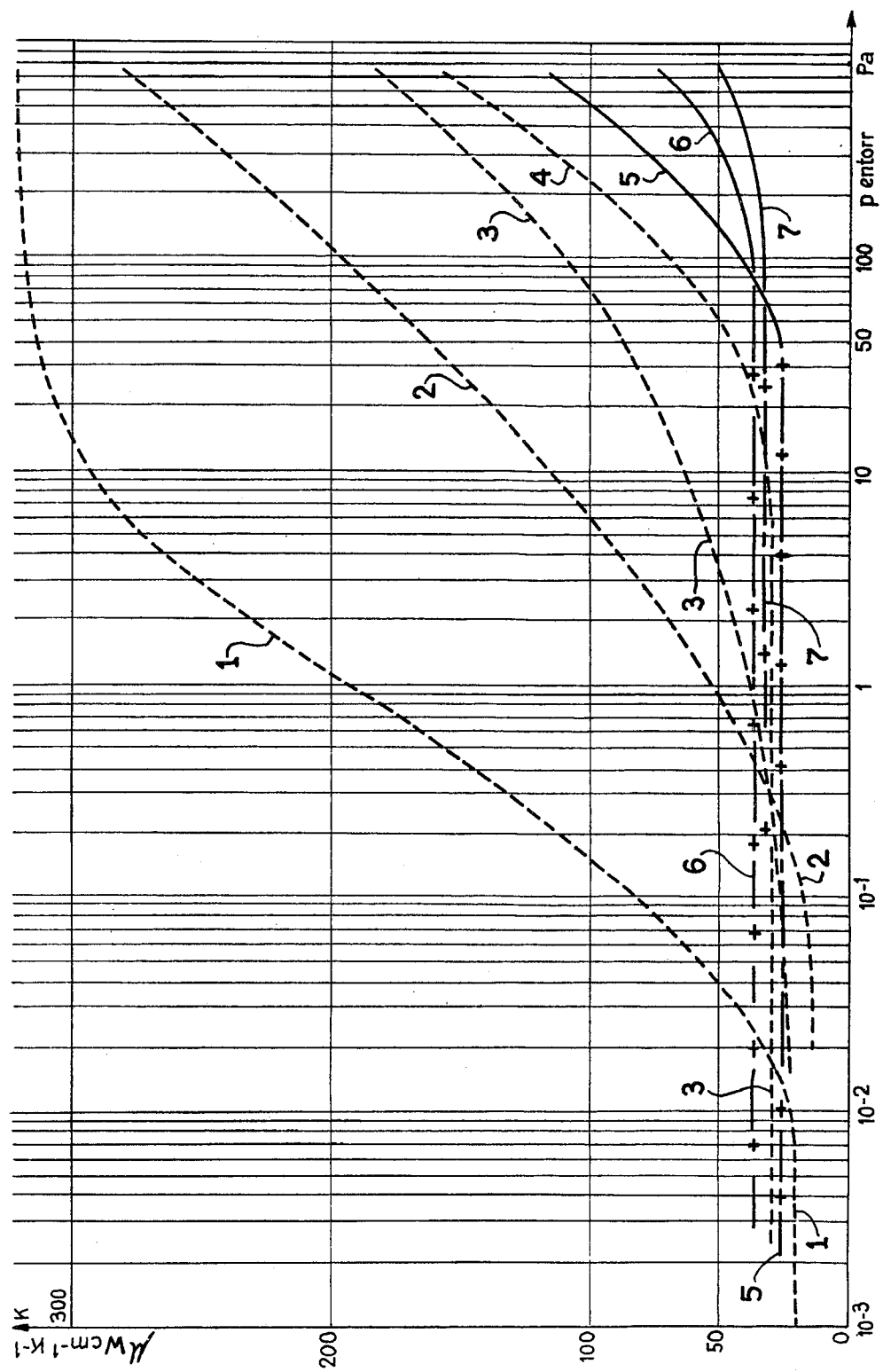

INSULATING MATERIAL WITH LOW THERMAL CONDUCTIVITY, FORMED OF A COMPACTED GRANULAR STRUCTURE

The present invention relates to an insulating material having low thermal conductivity.

Several types of insulators exist in the field concerned with thermal insulation, these being divided into three main classes: (1) the cellular insulators under normal pressure and of the expanded foam type, (2) the insulators in powder form under vacuum of the type comprising perlite, silica or other powder and (3) the multilayer insulators, or super-insulators, which are kept under a low pressure below $10^{-2}$ mm.Hg.

The insulators of the cellular type are very practical in use, but their insulating properties are frequently insufficient. The thermal conductivities of these bodies vary from 200 to 800 $\mu W\, cm^{-1}\, K^{-1}$, depending on the nature of the initial material and the nature of the expansion gas.

As regards the insulators in powder form or multilayer insulators, if they have a low thermal conductivity (from 0.5 to 20 $\mu W\, cm^{-1}\, K^{-1}$), they necessitate the pressure being maintained at very low values, and this represents disadvantages as regards complexity in establishing the structures and the high cost of manufacture.

It is known that there are three types of thermal transfer through an insulating material, namely: the heat transfer by radiation, by solid conduction and by gaseous conduction.

The study of these three forms of heat transfer, in the case of an insulating material in powder form, shows that the heat flux transmitted by radiation is a fixed value which only depends on the temperatures of the surfaces to be insulated and the emissivities of these surfaces. It is appropriate to point out that this flux can be considerably reduced by opacification of the powder. The solid conduction for a powdered insulating material depends essentially on the contact of the grains with one another, that is to say, on the compressing or compacting of the powder. The gaseous conduction depends on the intergranular pressure. In particular, when the free mean path of the gaseous molecules becomes larger than the intergranular distances, the conduction becomes negligible.

An insulating material of low thermal conductivity has now been found according to the invention. This material, having a compacted granular structure, conforms with the requirements of a reduced gaseous conduction without substantial increase as regards the solid conduction. It has a mean thermal conductivity of the order of 50 $\mu W\, cm^{-1}\, K^{-1}$ for a high internal gas pressure of the order of $P \leq 100$ mm.Hg.

The compacted product according to the invention has a mechanical behaviour or firmness which is just sufficient for being handled in the form of plates or bricks.

This novel material, at atmospheric pressure, constitutes a very interesting insulating material, which is incombustible and has practically twice the performance of the organic foams with the best insulating powers.

The insulating material according to the invention gives very satisfactory results at low temperatures, high temperatures and at ambient temperatures, with relatively small insulation thicknesses for good thermal characteristics.

The compacted granular structure is formed of silica-based primary particles, obtained by subjecting a compound of silane, such as tetrachlorosilane, to heat.

It is to be pointed out that the finer a powder which is prepared by heat treatment, the more it lends to compacted materials being obtained which have a low thermal conductivity, provided that the mean diameter of the primary particles is at most equal to 100 Å.

Moreover, as regards a fine powder of the type described above and of which the primary particles have a mean diameter of $\leq 100$ Å, it has been confirmed that the more it is compacted, the lesser is the thermal conductivity at or near atmospheric pressure. This is applicable when the apparent density $\Lambda a$ of the compacted structure, expressed in g/cc, is between $6 \times 10^{-3}$ d and $2.3 \times 10^{-3}$ d, d being the mean diameter of the primary particles expressed in Å; in addition, this density $\Lambda a$ is at most equal to two thirds of the density of the solid material. Moreover, the amount of compacting is limited by the economic interest of the material, represented by a price-performance ratio.

The curves which are represented on the accompanying FIGURE clearly show the critical nature of the characteristics of the invention. The thermal conductivities K of the materials, expressed as $\mu W\, cm^{-1}\, K^{-1}$, are plotted as ordinates, and the intergranular gas pressures, expressed as mm.Hg in accordance with a logarithmic scale, are plotted on the abscissae; Pa represents atmospheric pressure.

The curves 1 to 7 show the thermal conductivity between 77 K and 300 K for different powders and grain sizes, as a function of the intergranular pressure.

The curve 1 corresponds to a perlite of the grain size 0.6 mm and an apparent density of 0.08, in the form of non-compacted powder. It is established that materials of low thermal conductivity are only obtained by keeping the pressure at very low values, this necessitating large and costly vacuum means.

Curve 2 corresponds to a silica powder obtained by precipitation, the mean diameter of the primary particles of this powder being 50 Å and the apparent density of the uncompacted powder being 0.2. It is established that this silica powder is of no interest, the thermal conductivity being too high, especially at atmospheric pressure, although the primary particle is at 50 Å. In addition, as the crystalline lattice of the primary particles is very rigid, the thermal resistances by contact decrease at the time of compacting; consequently, the compacting pressure is not beneficial for this type of powder.

Curve 4 corresponds to a material obtained from a silica powder marketed by Degussa under the commercial mark "Aerosil 200", of which the mean diameter of the primary particles is close to 120 Å. After a compression by a factor 3, the apparent density of the compressed powder reaches about 0.23 g/cc. It is noted that a powder with a grain size larger than 100 Å is of no interest within the scope of the invention, because it leads to a compacted material with a too large thermal conductivity, even if this powder is compressed in such a manner that the apparent density of the compacted structure is within the selected range. As regards the powders corresponding to curves 1, 2 and 4, it has been confirmed that the thermal conductivity increases when the density of the material increases. A powder with a grain size larger than 100 Å does not permit obtaining a thermal conductivity $K < 150$ $\mu W\, cm^{-1}\, K^{-1}$ at atmospheric pressure. Furthermore, in order to obtain a thermal conductivity K of 50 $\mu W\ cm^{-1}\ K^{-1}$, the intergranular pressure must be below 50 mm.Hg, and this constitutes difficulties in the establishment of the structures and involves a high cost of manufacture.

Curves 3 and 5 correspond to a material produced from the commercial powder "Aerosil 380" of Degussa, obtained by pyrogenation or heat treatment of tetrachlorosilane, like all the "Aerosil" powders; the mean diameter of the particles is in the region of 70 A, the density of the uncompacted powder is equal to 0.06 and, after compacting by a factor 3, the apparent density of the material is equal to 0.17. The curve 3 corresponds to the performances of the uncompacted powder and curve 5 to those of the compacted material. The comparison of the two curves shows that a powder obtained by pyrogenation of a compound of silane, although having primary particles of 70 Å (<100 Å) does not lead to the results which are the aim of the invention if it is not slightly compressed (curve 3), while this same powder, compacted in a manner such that the apparent density of the material comes within the selected range (curve 5) permits a material to be obtained which has very good performance.

Curves 6 and 7 correspond to silica powders of which the characteristics and the amount of compacting come within the scope of the invention. Curve 6 designates the "Aerosil 500" powder, having a mean diameter of primary particles of 50 Å, compacted to a factor 4.2 and of which the apparent density of the compressed powder is 0.22. Curve 7 represents a powder obtained by pyrogenation of tetrachlorosilane, of which the mean diameter of the primary particles is from 25 to 35 Å, the density of the uncompacted powder being 0.07; after being compressed, it is seen that the thermal conductivity of the compacted material, as in the case of curve 6, is particularly low, even at atmospheric pressure.

In addition, the insulating material with the compacted granular structure is characterized by the number of primary particles per cubic centimeter. These are between $0.8 \times 10^{16} \times (500/d)^2$ and $2.1 \times 10^{16} \times (500/d)^2$, and preferably their number is close to $1.4 \times 10^{16} \times (500/d)^2$, d being, as previously, the mean diameter of the primary particles, which is at most equal to 100 A.

For such particle diameters, the apparent density of an uncompressed powder is very low, which leads to still considerable theoretical intergranular distances and, for this reason, an appreciable gaseous conduction is observed as soon as the intergranular pressure reaches a few mm.Hg.

In order to eliminate this phenomenon, in accordance with the invention, ultra fine powders which are based on silica, which is possibly alkylated and more particularly methylated, prepared by pyrogenation of a silane derivative, of which the particle diameter is at most equal to 100 Å, and is preferably between about 25 Å and 100 Å, are compacted by a certain factor until the apparent density of the powder as thus compressed reaches the chosen value which is between $6.10^{-3}\ d$ and $2.3.10^{-3}\ d$.

The compacting is a mechanical compacting carried out in a press, or by pressure (hydraulic or gaseous).

Under these compacting conditions, it is possible to produce bricks or panels having a thermal conductivity of the order of 50 $\mu W\ cm^{-1}\ K^{-1}$, by using, for example, tight skins or coverings (permeability to the leakage rate $<10^{-7}\ tl/s\ cm^2$) of the polyethylene type, mylar, polyvinyl chloride, epoxy adhesives ... or other metallic or metalloplastic materials. A thermal conductivity of about 125 $\mu W\ cm^{-1}\ K^{-1}$ characterizes an insulating material which is already very interesting with respect to the best insulating organic foams, the performances of which are two times less satisfactory. Furthermore, in this case, it is unnecessary to arrange an air-tight surface covering. In the case where a covering is placed in position, it is possible to change the nature of the gas. By way of example, crypton, xenon or another gas less conductive than "freon" in place of air or nitrogen, permits the thermal conductivity of the insulation to be considerably lowered at atmospheric pressure. A gain of 15 to 50% is obtained, depending on the nature of the gas.

As an insulator at low temperature, the compacted granular material according to the invention is particularly suitable for the insulation of refrigerated transporters, lorries, semi-trailers, containers for oxygen, nitrogen, liquefied natural gas, ethylene, etc. In this field, it competes with the organic foams and with perlite.

It is also very suitable for the insulation of refrigerators and freezers, with relatively small thicknesses of insulation.

The novel insulating material, which is incombustible and compatible with oxygen, will be particularly appreciated in the field of high temperatures for ovens and furnaces, such as pyrolysis furnaces.

At ambient temperature, its incombustible and insulating nature makes the novel material of particular interest in the building sector, externally as a dampproofing barrier and internally as a very good sound insulator.

Examples illustrating the invention without any limiting character are given below.

Example 1

The powder used is the ultra-fine silica powder sold under the commercial mark "Aerosil 380" by Degussa; the mean diameter of the primary particles is in the region of 70 Å. The apparent density of the uncompressed powder is very low: 0.060 g/cc.

The powder is compacted by mechanical pressure by a factor 4.6, that is to say, until the apparent density of the compressed powder reaches about 0.28 g/cc.

Under these compacting conditions, the thermal conductivity is 60 $\mu W\ cm^{-1}\ K^{-1}$ between $-25°$ and $+25°$ C., for an intergranular pressure close to 300 mm.Hg.

The thermal conductivity is 110 $\mu W\ cm^{-1}\ K^{-1}$, between 300 and 77 K at atmospheric pressure.

Example 2

Used in this example is the "Aerosil 380" powder, which has been subjected to a methylation treatment.

As previously, compacting to a factor 4.6 is carried out. Under these compacting conditions, the thermal conductivity is 45 $\mu W\ cm^{-1}\ K^{-1}$ between $-25°$ and $+25°$ C. for an intergranular pressure close to 300 mm.Hg.

The thermal conductivity is 90 $\mu W\ cm^{-1}\ K^{-1}$ between 300 and 77 K at atmospheric pressure.

Example 3

The powder used is the ultra-fine silica powder sold under the commercial mark "Aerosil 500" by Degussa. The mean diameter of the primary particles is 50 Å. The apparent density of the uncompacted powder is 0.05 g/cc. It is compacted to a factor 4.3. The apparent density of the compressed powder is about 0.23 g/cc.

Under these compacting conditions, the thermal conductivity is 82 $\mu$W cm$^{-1}$ K$^{-1}$ between $-25°$ and $+25°$ C., for an intergranular pressure close to 300 mm.Hg.

The thermal conductivity is 74 $\mu$W cm$^{-1}$ K$^{-1}$ between 300 and 77 K at atmospheric pressure.

We claim:

1. Insulating material having low thermal conductivity, formed of a compacted granular structure of silica-based primary particles, wherein the silica powder is obtained by heat treatment or pyrogenation of a silane compound; the mean diameter of the primary particles being at most equal to 100 Å; said silica-based, ultra-fine primary particles having been compacted mechanically to provide an apparent density of the compacted structure, expressed in g/cc, being $6 \times 10^{-3}$ d and $2.3 \times 10^{-3}$ d wherein d is the mean diameter of the primary particles expressed in Å; said apparent density being at most equal to two thirds of the density of the solid material; and said granular compacted structure containing at least $0.8 \times 10^{16} \times (500/d)^2$ primary particles per cubic centimeter.

2. Insulating material having low thermal conductivity in accordance with claim 1, wherein the mean diameter of the primary particles of the silica powder is between 25 and 100 A and the number of primary particles per cubic centimeter is between $0.8 \times 10^{16} \times (500/d)^2$ and $2.1 \times 10^{16} \times (500/d)^2$.

3. Insulating material having low thermal conductivity in accordance with claim 1, wherein the apparent density of said compacted structure is about $4 \times 10^{-3}$ d and the number of primary particles is about $1.4 \times 10^{16} \times (500/d)^2$.

4. Insulating material in accordance with claim 1, wherein the silica powder is obtained by heat treatment of tetrachlorosilane.

5. Insulating material in accordance with claim 1, wherein the particles comprise alkylated silica.

6. Insulating material in accordance with claim 5, wherein the particles comprise methylated silica.

7. Insulating material in accordance with claim 1 in the form of bricks or panels.

8. Insulating material in accordance with claim 7, wherein said bricks or panels are covered with a skin selected from the group consisting of polyethylene, polyethylene terephthalate, polyvinyl chloride, epoxy adhesive, metallic foil or a metalloplastic material layer.

9. Insulating material in accordance with claim 8, wherein the permeability of said tight skin covering is less than $<10^{-7}$ tl/s cm$^2$).

10. Insulating material in accordance with claim 8, wherein the gas located between the ultra-fine silica-based particles comprises a low conductivity gas.

11. Insulating material in accordance with claim 10, wherein said low conductivity gas is selected from the group consisting of krypton, xenon and Freon.

12. In a refrigerator for containing or transporting products therewithin at a low temperature, and comprising at least one wall having a thermal insulating layer, the improvement wherein said thermal insulating layer comprises the insulating material of claim 1.

13. In an oven or furnace having at least one insulating wall, the improvement wherein said insulating wall comprises the insulating material of claim 1.

14. In a building comprising an insulating wall, the improvement wherein said insulating wall comprises the material of claim 1.

15. Insulating material in accordance with claim 1 having a mean thermal conductivity on the order of 50 $\mu$W cm$^{-1}$ K$^{-1}$ for a high internal gas pressure on the order of P$\leq$100 mm Hg.

16. Insulating material in accordance with claim 1 having a thermal conductivity less than 150 $\mu$W cm$^{-1}$ K$^{-1}$ at atmospheric pressure.

* * * * *